United States Patent
Kodani et al.

(10) Patent No.: US 9,515,533 B2
(45) Date of Patent: *Dec. 6, 2016

(54) ROTARY BODY DRIVING APPARATUS

(71) Applicant: Shinano Kenshi Kabushiki Kaisha, Ueda-shi, Nagano (JP)

(72) Inventors: Masayuki Kodani, Ueda (JP); Nobuchika Maruyama, Ueda (JP)

(73) Assignee: SHINANO KENSHI KABUSHIKI KAISHA, Ueda-Shi, Nagano (JP)

(*) Notice: Subject to any disclaimer, the term of this patent is extended or adjusted under 35 U.S.C. 154(b) by 0 days.
This patent is subject to a terminal disclaimer.

(21) Appl. No.: 14/881,662

(22) Filed: Oct. 13, 2015

(65) Prior Publication Data
US 2016/0149458 A1    May 26, 2016

(30) Foreign Application Priority Data
Nov. 26, 2014   (JP) ................ 2014-238498

(51) Int. Cl.
| | |
|---|---|
| G02B 26/08 | (2006.01) |
| H02K 5/04 | (2006.01) |
| H02K 5/16 | (2006.01) |
| H02K 11/00 | (2016.01) |
| H02K 1/02 | (2006.01) |
| G02B 7/182 | (2006.01) |
| G02B 26/12 | (2006.01) |
| H02K 21/22 | (2006.01) |

(52) U.S. Cl.
CPC ............. *H02K 5/04* (2013.01); *G02B 7/1821* (2013.01); *G02B 26/121* (2013.01); *H02K 1/02* (2013.01); *H02K 5/161* (2013.01); *H02K 11/0015* (2013.01); *H02K 11/21* (2016.01); *H02K 11/215* (2016.01); *H02K 21/22* (2013.01)

(58) Field of Classification Search
CPC ........ H02K 11/33; H02K 29/08; H02K 21/22; H02K 11/21; H02K 11/215; H02K 5/161; H02K 11/0015; H02K 1/02; H02K 5/04; G02B 26/121; G02B 26/122; G02B 5/09; G02B 7/1821
USPC ....... 359/200.1, 216.1–219.2, 850, 855; 310/40 R, 46, 48, 66, 68 B, 90.5; 347/243, 347/259–261
IPC ................... H02K 21/22, 11/21, 11/215, 5/161, 11/0015, 1/02, 5/04
See application file for complete search history.

(56) References Cited

U.S. PATENT DOCUMENTS

| | | | |
|---|---|---|---|
| 4,658,162 A | 4/1987 | Koyama et al. | |
| 4,836,631 A | 6/1989 | Shimazu et al. | |
| 5,245,234 A | 9/1993 | Okada et al. | |
| 5,260,619 A | 11/1993 | Hara | |
| 5,408,153 A | 4/1995 | Imai et al. | |
| 2006/0139442 A1* | 6/2006 | Kurita ................. | G02B 26/121 347/261 |

FOREIGN PATENT DOCUMENTS

| | | |
|---|---|---|
| EP | 1 115 022 | 7/2001 |
| JP | S60 70956 | 4/1985 |
| JP | S-62254113 | 11/1987 |
| JP | H02 60449 | 2/1990 |
| JP | H-0666260 | 9/1994 |
| JP | H08 62527 | 3/1996 |
| JP | H-08305787 | 11/1996 |
| JP | 2 902514 | 6/1999 |
| JP | 2000 330062 | 11/2000 |
| JP | 2004062083 | * 2/2004 |
| JP | 2006-162795 | 6/2006 |

OTHER PUBLICATIONS

European Search Report issued/mailed May 18, 2016 in corresponding European Patent Application No. 15193685.
European Search Report dated Apr. 21, 2016 in corresponding European Patent Application No. 15188951.6.

* cited by examiner

*Primary Examiner* — James Phan
(74) *Attorney, Agent, or Firm* — Stephen J. Weyer, Esq.; Stites & Harbison, PLLC

(57) ABSTRACT

The rotary body driving apparatus comprises: a rotary body having reflective surfaces; a motor having a rotor shaft; a rotor being attached to one end part of the rotor shaft together with the rotary body; a stator housing having a bearing section, which rotatably holds the rotor shaft; a motor substrate for detecting a rotational position of the rotor, the motor substrate being provided to the stator housing; a magnetized section for frequency generation, the magnetized section being formed into a ring shape and provided to an end surface of the rotary body facing the motor substrate; and a circular frequency generation pattern, which faces the magnetized section, being provided to the motor substrate and disposed close to the magnetized section.

6 Claims, 2 Drawing Sheets

ROTARY BODY DRIVING APPARATUS

CROSS-REFERENCE TO RELATED APPLICATION

This application is based upon and claims the benefit of priority of the prior Japanese Patent Application No. 2014-238498, filed on Nov. 26, 2014, and the entire contents of which are incorporated herein by reference.

FIELD

The present invention relates to a rotary body driving apparatus, in which a rotary body, e.g., tilt mirror, polygon mirror, is attached to a rotor shaft together with the rotor.

BACKGROUND

In a rotor of an outer rotor-type driving apparatus, a cup-shaped rotor yoke is attached to one end part of a rotor shaft, and the rotor shaft is rotatably held by a stator housing. A circular rotor magnet is provided inside of a rotor yoke, and the rotor magnet is set to face pole teeth of a stator iron core assembled in the stator housing.

A magnetized section for frequency generation (e.g., FG magnet) is provided to a lower flange part of a circular wall of the rotor yoke. A frequency generation pattern (FG pattern), which faces the FG magnet, is formed in a substrate so as to detect a rotational position of the rotor (see Patent Document 1).

PRIOR ART DOCUMENT

Patent Document 1: Japanese Laid-open Patent Publication No. 2006-162795

SUMMARY

However, in case that the FG magnet for frequency generation is provided to the lower flange part of the circular wall of the rotor yoke to detect the rotational position of the rotary body as disclosed in the Patent Document 1, an assembling position of the FG magnet is separated from the rotary body, and attachment tolerances are accumulated in the steps of assembling and producing the apparatus. Therefore, accuracy of detecting the rotational position of the rotary body must be lowered.

In case of detecting rotational positions of reflective surfaces of the rotary body, if the FG magnet is provided to the rotor yoke, an outer diameter of the rotor is limited according to a size of a motor, so number of magnetic poles of the FG magnet is limited. Therefore, resolution of a sensor for detecting the rotational position of the rotary body cannot be improved. Further, if a clearance between the FG magnet and the FG pattern is large, magnetic fluxes caused by the FG magnet cannot interlink the FG pattern, so detection accuracy and detection sensitivity must be lowered.

The present invention has been invented to solve the above described problems of the conventional technology.

Accordingly, an object of the present invention is to provide a rotary body driving apparatus, which is capable of reducing a production cost by reducing number of structural parts and highly precisely detecting a rotational position of a rotary body.

To achieve the object, the present invention has following structures.

Namely, the rotary body driving apparatus of the present invention basically comprises:
a rotary body having a plurality of reflective surfaces;
a motor having a rotor shaft;
a rotor being attached to one end part of the rotor shaft together with the rotary body;
a stator housing having a bearing section, which rotatably hold the rotor shaft;
a motor substrate for detecting a rotational position of the rotor, the motor substrate being provided to the stator housing;
a magnetized section for frequency generation, the magnetized section being formed into a ring shape and provided to an outer edge of an end surface of the rotary body facing the motor substrate; and
a circular frequency generation pattern, which faces the magnetized section, being provided to the motor substrate and disposed close to the magnetized section.

By providing the magnetized section to the outer edge of the end surface of the rotary body facing the motor substrate and providing the frequency generation pattern, which faces the magnetized section, to the motor substrate and disposed close to the magnetized section, a rotational position of the rotary body can be highly precisely detected.

In the rotary body driving apparatus, the rotary body may be formed into a multiple truncated pyramid shape,
the reflective surfaces may be formed in outer surfaces of the rotary body, and
the magnetized section may be integrally attached to an outer edge of an axially maximum width part of the rotary body.

With this structure, in comparison with a case of providing the magnetized section to a rotor yoke, an outer diameter of the magnetized section (FG magnet) can be increased as much as possible, number of magnetic poles of the magnetized section can be increased, an outer diameter of the frequency generation pattern can be increased, and numbers of generation wire elements and connection wire elements can be increased, so that the rotational position of the rotary body can be highly precisely detected.

Preferably, the magnetized section is integrally attached to the rotary body with a back yoke composed of a magnetic material.

With this structure, a magnetic flux path caused by the magnetized section (FG magnet) can be expanded, so that number of magnetic fluxes interlinking the frequency generation pattern (FG pattern) can be increased and detection sensitivity can be improved.

In the rotary body driving apparatus, a plurality of the circular frequency generation patterns may be concentrically formed in the motor substrate, and
the frequency generation patterns may be shifted, from each other, by a half pitch.

With this structure, one of the frequency generation patterns (FG patterns) is wired within each of the pitches of another frequency generation pattern, so that the position of the magnetized section (FG magnet), i.e., the rotational position of the rotary body, can be highly precisely detected.

In the rotary body driving apparatus, a plurality of the circular frequency generation patterns may be stacked, in a same phase, on the motor substrate.

With this structure, the magnetic fluxes caused by the magnetized section (FG magnet) can interlink the frequency generation patterns (FG patterns), so that an induced electromotive force can be increased. Therefore, sensitivity of detecting the rotational position of the rotary body can be improved.

In the rotary body driving apparatus, the rotary body may be a tilt mirror having a plurality of tilted reflective surfaces or a polygon mirror having a plurality of reflective surfaces, and the tilt mirror or the polygon mirror may be integrally attached to a rotor yoke and retained in an axial direction.

In this case, controllability of the mirror can be improved by highly precisely detecting the rotational position of the tilt mirror or the polygon mirror.

By the present invention, the rotary body driving apparatus, which can reduce a production cost by reducing number of the structural parts and which can highly precisely detect the rotational position of the rotary body, can be realized.

BRIEF DESCRIPTION OF THE DRAWINGS

Embodiments of the present invention will now be described by way of examples and with reference to the accompanying drawings which are given by way of illustration only, and thus are not limitative of the present invention, and in which.

DESCRIPTION OF THE EMBODIMENTS

Preferred embodiments of an optical scanner, which is an example of a rotary body driving apparatus relating to the present invention, will now be described in detail with reference to the accompanying drawings. Firstly, the optical scanner, which reflects and irradiates a laser beam emitted from a laser irradiation unit in a wide range so as to measure a distance, e.g., an inter-vehicle distance, a distance to an obstacle, will be explained.

Figure 1:
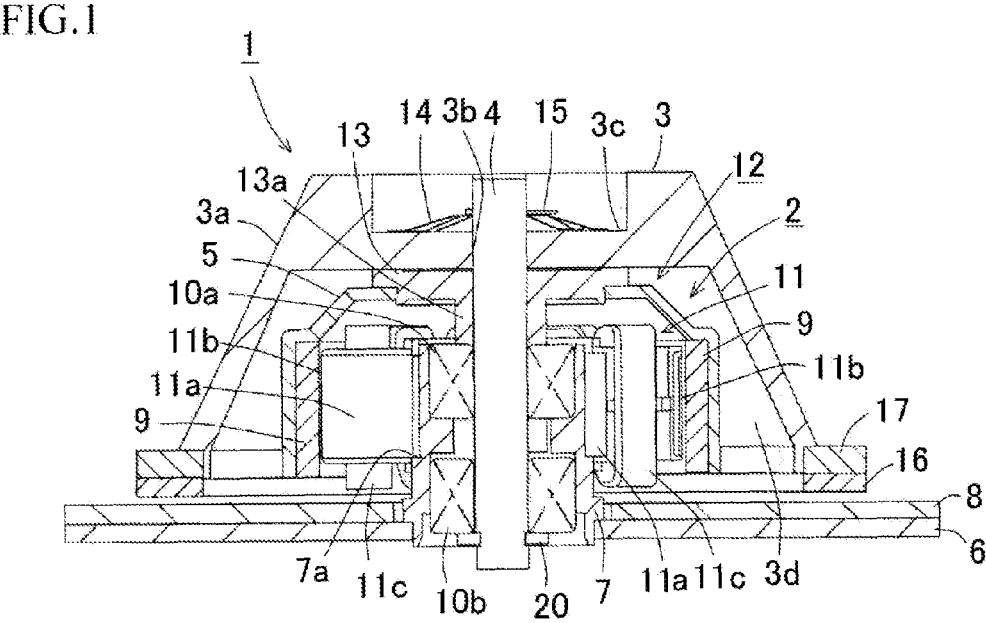
FIG. 1 is an axially sectional view of an optical scanner.

As shown in FIG. 1, in the optical scanner 1, a tilt mirror (rotary body) 3 having, for example, four reflective surfaces 3a, which are outer side surfaces and whose inclination angles are different from each other, is attached to one end part of a rotor shaft 4 of a motor 2 (see FIG. 2) together with a rotor yoke 5. The tilt mirror 3 and the rotor yoke 5 are prohibited from detaching from and rotating with respect to the rotor shaft 4.

Figure 4:
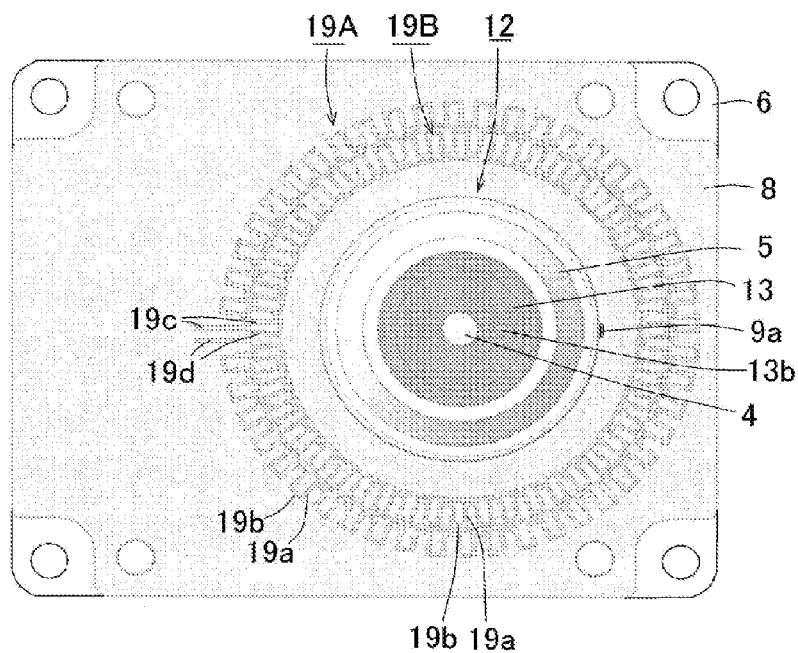
FIG. 4 is a plan view of a modified example of the motor substrate shown in FIG. 3(B).

Firstly, a structure of the motor 2 will be explained. As shown in FIG. 4, a bearing housing 7 (stator housing) is integrally attached to a base plate 6. A motor substrate 8, on which Hall elements for detecting magnetic poles of a rotor magnet 9, etc. are mounted, is attached on the base plate 6.

A first bearing section 10a and a second bearing section 10b are attached in the bearing housing 7 which is formed into a cylindrical shape. For example, the first bearing section 10a and the second bearing section 10b are rolling bearings. A step-shaped part 7a is formed in an outer surface of the bearing housing 7. A stator 11 is attached to the step-shaped part 7a. In the stator 11, a stator core 11a is covered with insulators and motor coils 11c are respectively wound on magnetic pole teeth 11b. The stator core 11a is fixed to the bearing housing 7 by press fit and adhesive.

The rotor shaft 4 of a rotor 12 is rotatably held by the first bearing section 10a and the second bearing section 10b provided in the bearing housing 7. The cylindrical rotor yoke 5 and a rotor hub 13 are integrated with each other by caulking. A cylindrical sleeve 13a is axially extended from a center part of the rotor hub 13 toward the rotor yoke 5. The rotor shaft 4 is integrally fitted into the hole of the sleeve 5c by press fit, shrink fit, adhesive, etc. A projection 13b (see FIG. 2) is provided on an axially opposite side of the sleeve 13a of the rotor hub 13. A plurality of the projections 13b may be formed. The rotor magnet 9 is integrally attached on an inner circumferential surface of the rotor yoke 5. In the rotor magnet 9, magnetic N-poles and magnetic S-poles are alternately formed and faced to the pole teeth 11b of the stator 11.

Figure 2:
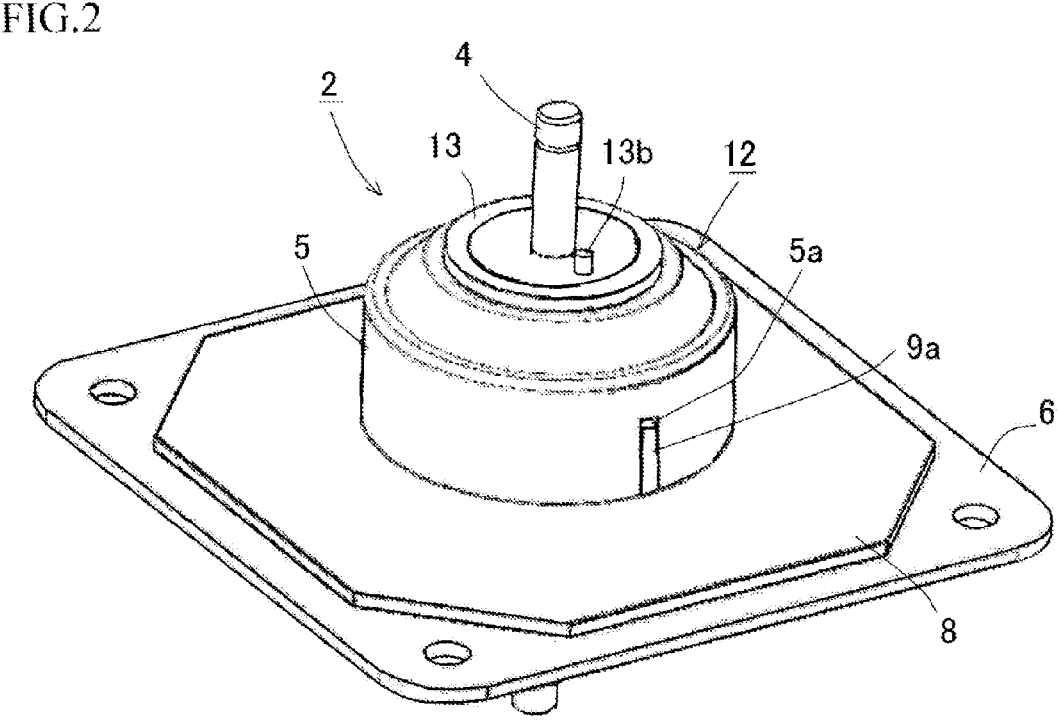
FIG. 2 is a perspective view of the optical scanner shown in FIG. 1, in which a tilt mirror is detached.

As shown in FIG. 2, a notched part 5a is formed in a part of the rotor yoke 5. A part of the rotor magnet 9, which is exposed in the notched part 5a, is used as a position detecting magnet 9a. A circumferential position of the position detecting magnet 9a provided to the rotor yoke 5 and that of the projection 13b of the rotor hub 13 are corresponded to each other.

The tilt mirror 3 is integrated with the rotor 11. As shown in FIG. 1, the tilt mirror 3 is formed into a multiple truncated pyramid shape and has a plurality of the reflective surfaces (e.g., four reflective surfaces) 3a, which are outer side surfaces and whose inclination angles are different from each other. A shaft hole (through-hole) 3b, through which the rotor shaft 4 is penetrated, is formed at a center part of the tilt mirror 3. In an upper surface of the tilt mirror 3, a recessed part 3c is formed around the shaft hole 3b. One end of the rotor shaft 4 is inserted into the recessed part 3c, and a press spring 14 and a retaining washer 15 are fitted therein so as to attach the tilt mirror 3 to the rotor shaft 4 without being detached. With this structure, an axial assembling space of the tilt mirror 3 can be made small.

The reflective surfaces 3a are mirror surfaces, which are formed by vapor-depositing metal on a material of the tilt mirror 3, e.g., metallic material, resin material, or polishing the same. Further, in the tilt mirror 3, an accommodating part 3d, which is a recessed part and capable of accommodating the rotor yoke 5, is formed in a bottom surface facing the motor 2.

Figure 3A:
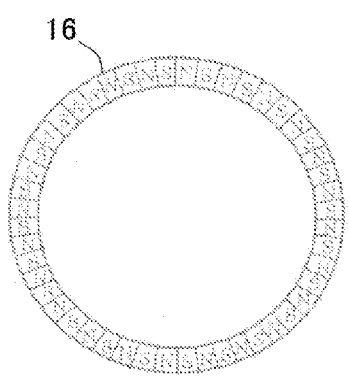
FIG. 3(A) is a plan view of an FG magnet shown in FIG. 1.

As shown in FIG. 1, a circular magnetized section (FG magnet) 16 is integrally attached to a lower surface of the tilt mirror 3 having the reflective surfaces 3a, i.e., an outer edge of an axially maximum width part the tilt mirror 3, with a back yoke 17 composed of a magnetic material. Note that, the back yoke 17 may be omitted. The FG magnet 16 is directly integrated with the outer edge of the lower end surface of the tilt mirror 3, which faces the motor substrate 8. As shown in FIG. 3(A), in the circular FG magnet 16, magnetic N-poles and magnetic S-poles are alternately formed. Number of the magnetic poles of the FG magnet 16, e.g., 120, is much greater than that of the rotor magnet 9.

Figure 3B:
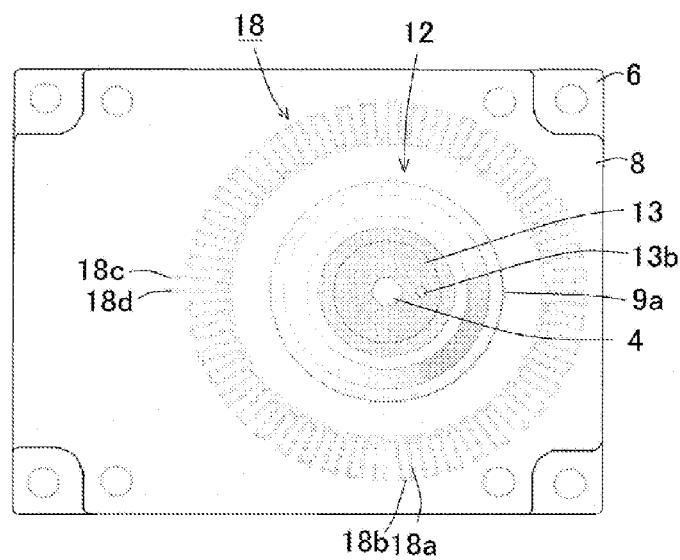
FIG. 3(B) is a plan view of a motor substrate on which a motor is mounted.

As shown in FIG. 3(B), a frequency generation pattern (FG pattern) 18 is formed on a surface of the motor substrate 8, which faces the FG magnet 16. The FG pattern 18 is constituted by: a pattern of generation wire elements 18a, which are radially formed and arranged in a circumferential direction; and a pattern of connection wire elements 18b, which are formed in the circumferential direction to connect the adjacent generation wire elements 18a to each other. The both patterns of the generation wire elements 18a and the connection wire elements 18b are formed like rectangular waves and alternately continued in the circumferential direction. FG signals are outputted from a pair of lead wires 18c and 18d. When the FG magnet 16 shown in FIG. 3(A) is rotated above the FG pattern 18 of the motor substrate 8, an induced electromotive force is induced in each of the generation wire elements of the FG pattern 18, so that the FG signals can be detected from the pair of lead wires 18c and 18d.

An example of a manner of assembling the optical scanner will be explained. In FIG. 1, the motor 2 is assembled by steps of: attaching the base plate 6 and the motor substrate 8 to the bearing housing 7; attaching the stator 11; and inserting the rotor shaft 4 of the rotor 12 into the through-hole of the bearing housing 7 so as to rotatably hold the rotor shaft 4 by the first and second bearing sections 10a and 10b. By fitting the projection 13b of the rotor 12 in a recessed part (not shown) of the tilt mirror 3, circumferential positions of the position detecting magnet 9a and the projection 13b of the rotor hub 13 can be aligned, a reference reflective surface of the tilt mirror 3 can be aligned with the rotor 12, and these members are assembled in this state. Further, the one end of the rotor shaft 4 is penetrated through the shaft hole 3b of the recessed part 3c formed in the upper surface of the tilt mirror 3, and the press spring 14 and the retaining washer 15 are fitted in the recessed part 3c, so that the tilt mirror 3 can be attached to the rotor shaft 4 and retained thereon. The other end of the rotor shaft 4 is retained, by a washer 20, without being detached from the bearing housing 7 (the second bearing section 10b).

As described above, the FG magnet 16 shown in FIG. 3(A) is disposed close to the FG pattern 18 shown in FIG. 3(B), so that the rotational position of the tilt mirror 3 can be highly precisely detected. Therefore, controllability of the tilt mirror 3 can be improved.

As described above, the circular FG magnet 16 is integrally attached along the outer edge of the axially maximum width part of the tilt mirror 3. Therefore, in comparison with a case of providing the FG magnet to the rotor yoke, the outer diameter of the FG magnet 16 can be increased, the number of the magnetic poles of the FG magnet 16 can be increased, the outer diameter of the FG pattern 18 can be increased, and the both numbers of the generation wire elements 18a and the connection wire elements 18b can be increased, so that the rotational position of the tilt mirror 3 can be highly precisely detected.

Next, another example of the motor substrate 8 will be explained with reference to FIG. 4. Note that, structures of the motor 2 and the tilt mirror 3 of the optical scanner 1 are the same as those of the above described example, so their detailed explanations will be omitted. As shown in FIG. 4, a plurality of circular frequency generation patterns (FG patterns) may be concentrically formed and shifted, from each other, by a half pitch.

Concretely, an outer FG pattern 19A and an inner FG pattern 19B are concentrically formed on the surface of the motor substrate 8, which faces the FG magnet 16. Each of the FG patterns 19A and 19b is constituted by: a pattern of generation wire elements 19a, which are radially formed and arranged in the circumferential direction; and a pattern of connection wire elements 19b, which are formed in the circumferential direction to connect the adjacent generation wire elements 19a to each other. The both patterns of the generation wire elements 19a and the connection wire elements 19b are formed like rectangular waves and alternately continued in the circumferential direction. FG signals are outputted from a pair of lead wires 19c and 19d.

Each of the generation wire elements 19a of the inner FG pattern 19B is disposed within each pitch of the generation wire elements 19a of the outer FG pattern 19A. Namely, the generation wire elements 19a of the outer FG pattern 19A and the generation wire elements 19a of the inner FG pattern 19B are mutually shifted by, for example, a half pitch. With this structure, the pitch of the generation wire elements 19a can be smaller, so that the rotational position of the tilt mirror 3 can be highly precisely and accurately detected.

Further, a plurality of the FG patterns may be stacked, in a same phase, on the motor substrate 8 as a multilayered pattern. For example, a four-layered substrate may be used as the motor substrate 8, and two electrically conductive patterns may be stacked as the FG patterns. In this case, the magnetic fluxes caused by the FG magnet interlink the FG patterns, so that the induced electromotive force can be increased and the sensitivity of detecting the rotational position of the rotary body can be improved.

In the above described embodiment, the rotary body is the tilt mirror 3 having the reflective surfaces 3a. But, the present invention is not limited to the above described embodiment. For example, the rotary body may be a polygon mirror having a plurality of reflective surfaces.

Further, the motor of the above described embodiment is the outer rotor-type motor. The present invention may be applied to the rotary body driving apparatus having an inner rotor-type motor.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alternations could be made hereto without departing from the spirit and scope of the invention.

What is claimed is:

1. A rotary body driving apparatus, comprising:
   a rotary body having a plurality of reflective surfaces;
   a motor having a rotor shaft;
   a rotor being attached to one end part of the rotor shaft together with the rotary body;
   a stator housing having a bearing section, which rotatably holds the rotor shaft;
   a motor substrate for detecting a rotational position of the rotor, the motor substrate being provided to the stator housing;
   a magnetized section for frequency generation, the magnetized section being formed into a ring shape and provided to an outer edge of an end surface of the rotary body facing the motor substrate; and
   a circular frequency generation pattern, which faces the magnetized section, being provided to the motor substrate and disposed close to the magnetized section.

2. The rotary body driving apparatus according to claim 1, wherein the rotary body is formed into a multiple truncated pyramid shape,
   the reflective surfaces are formed in outer surfaces of the rotary body, and
   the magnetized section is integrally attached to an outer edge of an axially maximum width part of the rotary body.

3. The rotary body driving apparatus according to claim 1, wherein the magnetized section is integrally attached to the rotary body with a back yoke composed of a magnetic material.

4. The rotary body driving apparatus according to claim 1, wherein a plurality of the circular frequency generation patterns are concentrically formed in the motor substrate, and
the frequency generation patterns are shifted, from each other, by a half pitch.

5. The rotary body driving apparatus according to claim 1, wherein a plurality of the circular frequency generation patterns are stacked, in a same phase, on the motor substrate.

6. The rotary body driving apparatus according to claim 1, wherein the rotary body is a tilt mirror having a plurality of tilted reflective surfaces or a polygon mirror having a plurality of reflective surfaces, and
the tilt mirror or the polygon mirror is integrally attached to a rotor yoke and retained in an axial direction.

* * * * *